March 12, 1963 R. W. AREL ETAL 3,081,394
HANDLE AND COVER MEANS FOR COOKING UTENSILS
Filed March 29, 1961 3 Sheets-Sheet 2
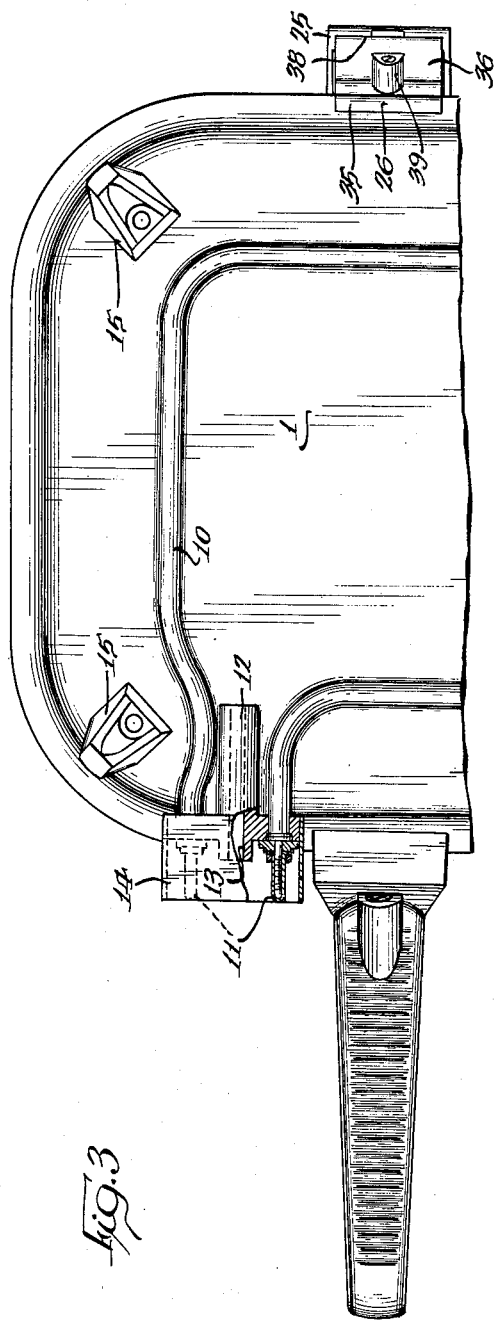
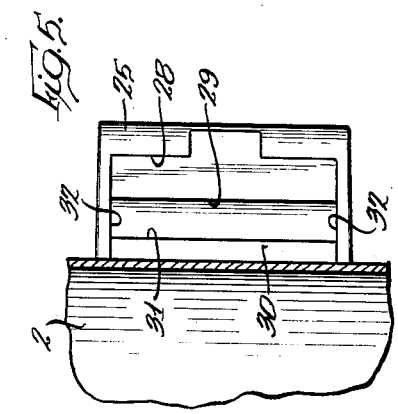
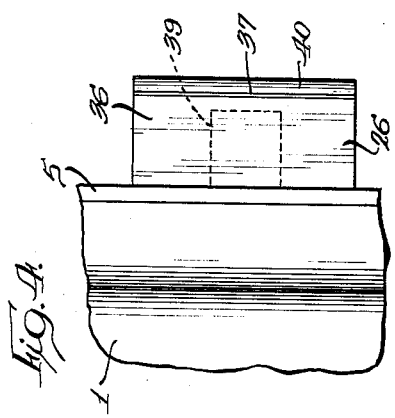
INVENTORS:
Robert W. Arel
Alfred W. Madl
By George R. Clark Atty March 12, 1963 R. W. AREL ETAL 3,081,394
HANDLE AND COVER MEANS FOR COOKING UTENSILS
Filed March 29, 1961 3 Sheets-Sheet 3
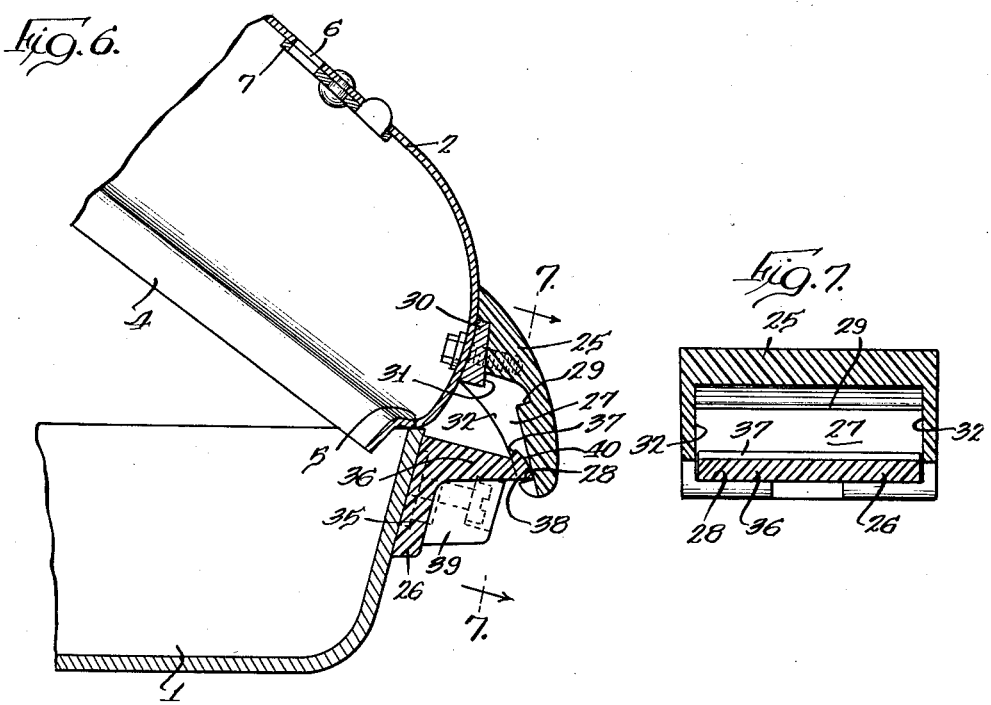
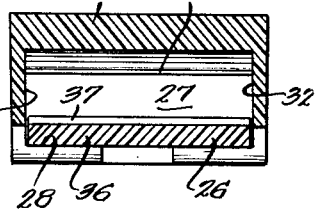
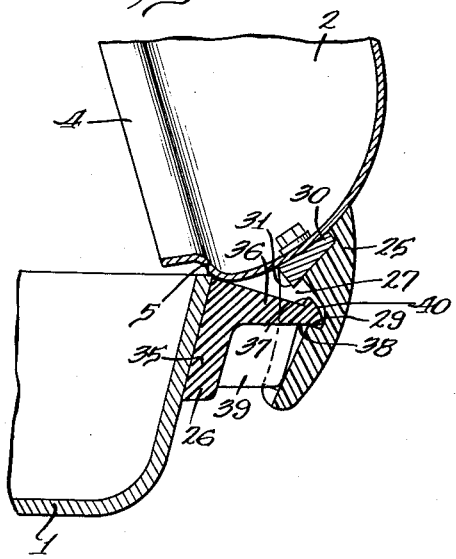
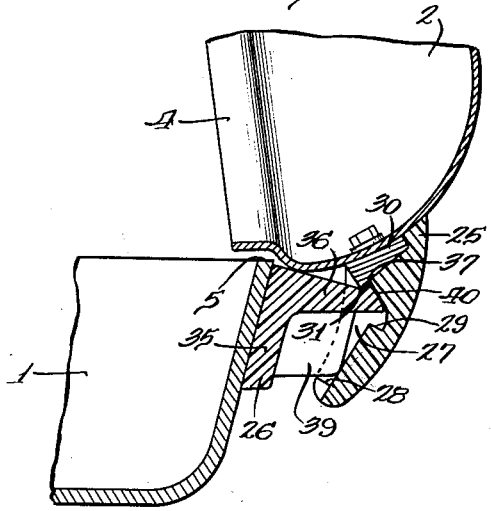
INVENTORS:
Robert W. Arel
Alfred W. Madl
By George R. Clark Atty 3,081,394
HANDLE AND COVER MEANS FOR COOKING UTENSILS
Robert W. Arel and Alfred W. Madl, Milwaukee, Wis., assignors to John Oster Manufacturing Co., Milwaukee, Wis., a corporation of Wisconsin
Filed Mar. 29, 1961, Ser. No. 99,247
17 Claims. (Cl. 219—44)

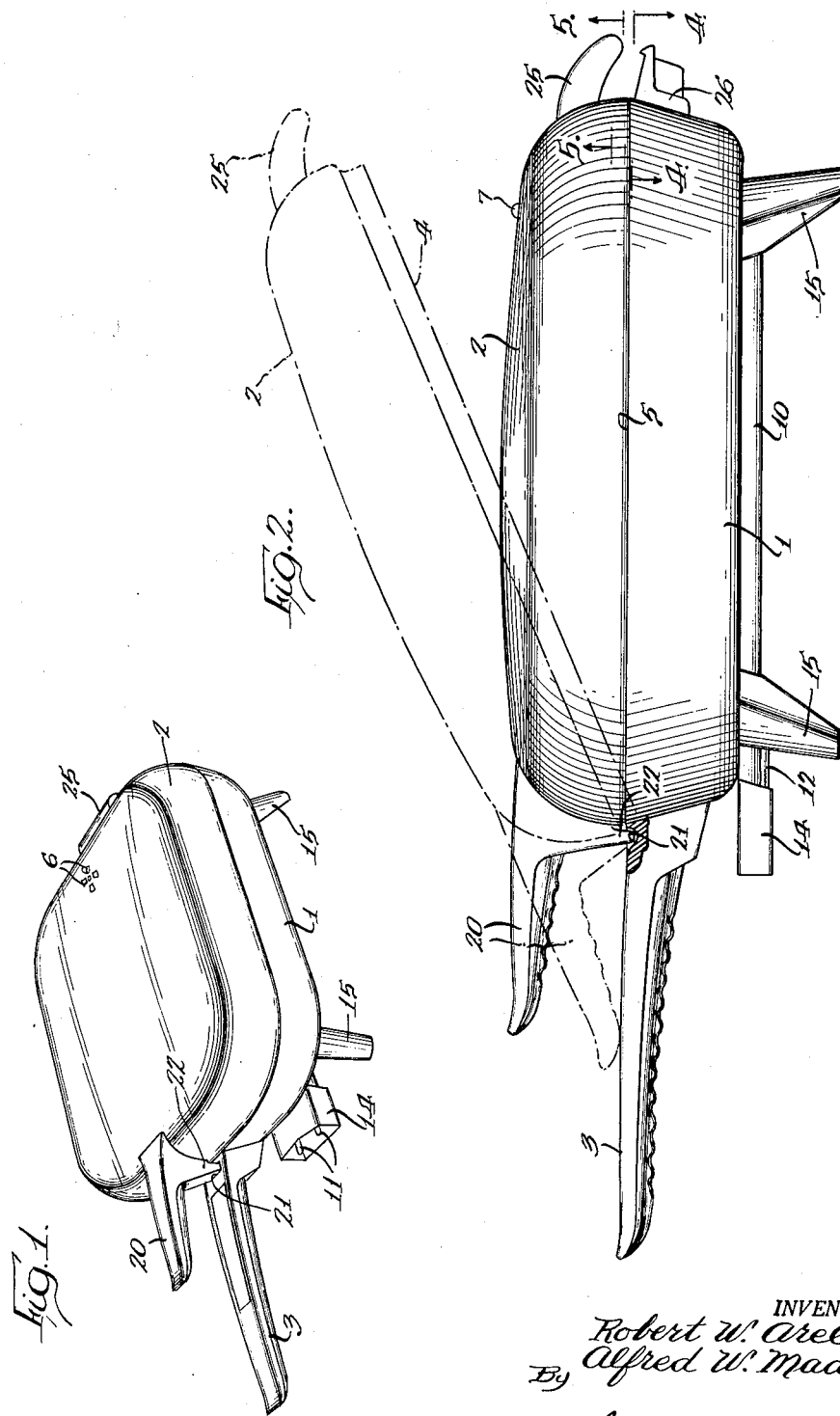

This invention relates to improved handle and cover means for cooking utensils, and more particularly, to improved means for tilting the covers of cooking utensils open, which means are also useful as handle structure for the vessel and cover of the cooking utensil.

The preferred form of the invention will be illustrated in connection with a fully immersible frypan having a built in electrical heating element and a removable temperature control element. This form of frypan is available on the commercial market. However, the invention is not necessarily restricted to this particular form of cooking utensil. For instance, the invention can also be used in connection with electrical frypans having non-removable temperature control means, and also frypans which do not have built in electrical heating means but are heated on the cooking surfaces of gas or electric ranges or the like. These other forms of cooking utensils are likewise available on the commercial market.

When preparing food in a frypan or other cooking vessel, the housewife may want to open the cover of the cooking vessel or receptacle to inspect or work on the food. For purposes of inspecting the food, it may be sufficient for the housewife's purpose to merely open one edge of the covered receptacle and then reclose the same after she has determined the condition of the food. However, under other conditions, the housewife may want to open one side of the covered receptacle and leave it open for a sufficient period to enable her to work on the food with both hands being free. Accordingly, it would be desirable to provide means in a cooking utensil to enable the housewife to temporarily tilt the cover open and then quickly reclose the same as well as to tilt the cover open for a longer period without making it necessary for the housewife to hold the cover open with one of her hands. Additionally, it would also be desirable to provide these advantages in conventional cooking utensils at a low cost and in an uncomplicated manner without requiring any major changes or modifications in the conventional basic structure of cooking utensils.

The means for accomplishing the above-described desirable characteristics in cooking utensils preferably should be easy to operate. That is to say, there should be a minimum of complications so that there is very little likelihood of jamming or sticking of the operative parts. Furthermore, it would be advantageous to provide the above-mentioned characteristics in cooking vessels by utilizing some of the conventionally provided structure of cooking utensils.

It is one object of this invention to provide an improved cooking utensil having the above-mentioned desirable characteristics.

It is a further object of the invention to provide an improved cooking utensil having means for momentarily tilting the cover thereof open and also means for tilting the cover open for a longer period.

It is a further object of the invention to provide improved cover tilt open means in cooking utensils which will enable the housewife to momentarily tilt the cover open or to tilt the cover open for a longer period without making it necessary for the housewife to manually hold the cover open when it is desired to have the cover open for the relatively longer period.

It is a further object of the invention to satisfy the above set forth objects in an uncomplicated and low cost manner which is easy to install and operate and which requires no major changes or modifications in the conventional basic structure of existing frypans.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings, FIG. 1 is a perspective view of a frypan having one form of the invention incorporated therein;

FIG. 2 is an enlarged broken-away side elevational view of the frypan;

FIG. 3 is a broken-away bottom view of the frypan;

FIG. 4 is an enlarged sectional view taken along the section line 4—4 of FIG. 2;

FIG. 5 is an enlarged sectional view taken along the section line 5—5 of FIG. 2;

FIG. 6 is an enlarged broken-away view of the right-hand portion of the frypan of FIG. 2 with the cover in partial open position;

FIG. 7 is a sectional view taken along the section line 7—7 of FIG. 6; and

FIGS. 8 and 9 are views similar to FIG. 6 showing the relative position of the parts when the cover is moved to full open position.

Referring now particularly to the drawings, illustrated therein is a cooking utensil comprising a frypan having a shallow vessel or receptacle 1 which is closed by a cover 2. The vessel 1 has a main handle 3 connected thereto which is preferably constructed from thermal insulating material. Vessel 1 is shown as being generally square-shaped with rounded corners, but it will be obvious that vessel 1 could have other shapes. Handle 3 is connected to one side of vessel 1 centrally thereof.

The cover 2 is provided with a stepped flange or the like 4 along its peripheral portion. The flange 4 is adapted to be seated along the upper edge of the rim 5 of frypan 1 when the cover 2 is in closed position. Cover 2 is also provided with vent means which may comprise apertures 6 which are adapted to be closed by a rotatably mounted apertured plate or the like 7.

The frypan is provided with a built in electrical heating element indicated generally by reference numeral 10. Heating element 10 may comprise a sheathed electrical heating element which is built into the vessel 1 by brazing the same on the bottom thereof or integrally molding or casting the same therewith. Although the heating element 10 is illustrated as having a square shape with rounded corners, it will be obvious that it may have other configurations. The electrical terminals 11 of heating element 10 are disposed along the side of the vessel to which the handle 3 is connected. However, terminals 11 could be located on any other side of the vessel. The ends of the heating element 10 as well as the electrical terminals 11 therefor are sealed against the entrance of moisture or liquid as will be obvious to those skilled in the art. This is for the purpose of making the frypan immersible in cleaning liquids for washing.

The temperature of the vessel is preferably controlled by a not shown probe type removable control means which is well known in the art. For this purpose, the ends of heating element 10 as well as the electrical terminals 11 are supported by a somewhat T-shaped member 12 which can be connected to the underside of vessel 1 by brazing or the like. The member 12 has a recess or opening 13 formed therein which is adapted to receive the temperature sensing probe of the not shown removable control means. The electrical terminals 11 are received by socket type contacts of the not shown removable control means. The terminals 11 are protected by a shroud or guard 14 which is mounted on the member 12 in surrounding and spaced relationship with respect to the terminals 11. The shroud or guard 14 also serves as means for guiding the removable control into electrically connected and temperature sensing position. The parts 11 to 14 are disposed on the same side as handle 3 to conserve space. Also, preferably they are positioned to the right of the handle 3 to make it easy for the housewife to insert and remove the control means while holding handle 3.

Inasmuch as the frypan has a heating element 10 connected to its underside, it is necessary to space the frypan from support surfaces such as tables or the like to prevent damage thereto by burning, scorching or the like. To this end, a plurality of support means such as thermal insulating legs 15 are provided on the bottom of the frypan. The legs 15 are disposed adjacent the corners of the frypan and comprise 4 in number.

The frypan structure so far described is conventional and is present in frypans currently available on the commercial market. Further detailed explanation thereof is not believed to be necessary for a full understanding of the instant invention and is therefore being omitted.

The preferred means for momentarily or temporarily tilting the frypan cover 2 open will now be described. The cover 2 has a main handle 20 connected thereto which is preferably constructed from thermal insulting material. Handle 20 is elongated and projects laterally away from the cover 2 in superposed but vertically spaced relationship with respect to the vessel handle 3. At its inner end the handle 3 has a socket-like, concave or depressed surface 21 formed in the upper surface thereof. Socket-like surface 21 is adapted to receive a depending portion 22 which is preferably integrally formed on the inner end of cover handle 20. When cover 2 is properly positioned on vessel 1, the flange 4 is seated on the rim 5 of the vessel and portion 22 which is the equivalent of a pivot lug is aligned with the socket-like surface 21. The handle 20 is about one-half the length of handle 3 and when it is desired to momentarily or temporarily tilt the cover 2 open, all the housewife need do is push down on the handle 20. This will cause the cover 2 to open by pivotal movement of the flange 4 about the upper edge of rim 5 and pivotal movement of lug 22 in socket 21 until the outer end of handle 20 bottoms against the handle 3 (see FIG. 2). This will enable the housewife to make a quick inspection of the progress of the food being prepared in vessel 1. Release of handle 20 will effect an automatic return of cover 2 to its seated closed position due to the weight of cover 2. When cover 2 is tilted open, since the flange 4 is still disposed within the outline of rim 5, any collections of vapors, grease, juices or the like on the interior of cover 2 will drip back into the frypan vessel. Since the lug 22 is disposed in socket 21, it helps to keep flange 4 from sliding off the upper edge of rim 5 and the cover 2 aligned for quick reclosing movement. Also, in the absence of a part such as flange 4 for rocking the cover on the rim 5, the lug 22 and socket 21 could comprise the sole means for rocking the cover 2 open with respect to vessel 1.

As will be described hereinafter, handle 20 also plays a role in tilting cover 2 in an opposite direction for set or fixed tilted support of cover 2 with respect to vessel 1 while simultaneously permitting the housewife to have both hands free to work on the food or perform other kitchen chores. An additional purpose of handle 20 is to facilitate return of cover 2 to the vessel from its removed inverted position. That is to say, the housewife may desire to completely remove cover 2 from vessel 1. Conventionally she does this by setting it aside in inverted position. The inverted position is used so that vapor, grease, or juice collections on the inside of cover 2 will not run off on the support surface. When the housewife is ready to return cover 2 to closed position, she can do this handling cover 2 by handle 20. It will be appreciated by those skilled in the art that conventional cooking utensil covers have knobs or handles connected on the outer side thereof and centrally thereof. With such a disposition of the cover handle, the housewife is apt to burn herself in reaching for the handle inasmuch as the cover may be still quite hot when she decides to return it to the vessel 1. Therefore, handle 20 and its disposition provides a safe means by which the housewife may handle cover 2.

The means for moving cover 2 in an opposite tilted open direction and holding it set in tilted open position will now be described. This means comprises a pair of vertically spaced and aligned member 25 and 26 positioned on the side of cover 2 and vessel 1 opposite from handles 20 and 3. Preferably, members 25 and 26 are constructed from thermal insulating material so that they may serve as auxiliary handle means for cover 2 and vessel 1. The member 25 projects laterally away from cover 2 and is curved downwardly toward the member 26. Member 25 also has a recess 27 formed on its underside. Two catch edges or the like 28 and 29 are formed at the inner and outer ends of member 25 on the underside thereof. Member 25 is spaced from cover 2 by a thermal insulating material bracket 30 or the like which has a lower edge 31 facing recess 27 opposite the edge 29. The members 25 and 30 are secured together to the cover 2 by appropriate means such as a stud. The recess 27 is defined or bordered by two opposite side walls 32 which are spaced from each other by a distance which is slghtly greater than the width of element 26 so that the latter can be partially received within recess 27 in a manner to be described hereinafter. The purpose of the edges 28, 29 and 31 will be described following a more detailed description of the member 26. Additionally, it will be understood that the bracket or part 30 can be omitted and its edge 31 could be provided as an integral portion of the member 25 or part 30 could be formed integral with member 25.

The member 26 is generally L-shaped. One leg or the base thereof is positioned against the rim 5 of vessel 1 and the other leg 36 thereof projects laterally away from vessel 1. The outer end of leg 36 has two catch edges 37 and 38 formed thereon. A central apertured boss 39 or the like is integrally formed on member 26 for the purpose of receiving a through connector to fasten member 26 to the rim of vessel 1. The boss 39 also serves as a limit stop together with edges 31 and 37 in a manner hereinafter described.

Assuming that the housewife wishes to place the cover 2 in set tilted open position, all she need do is lift up on the handle 20 of the cover 2. As she does this, the cover 2 will pivot or rock about the upper edge of rim 5 on the right side of vessel 1 along the stepped flange 4 (see FIG. 6). As cover 2 is rocked or pivoted in a clockwise direction with the flange 4 and the upper edge of rim 5 engaged, the member 25 will move downwardly so as to carry the edge 28 past the outer end of leg 36 to beneath the edge 38 whereby the outer end of leg 36 enters the recess 27. The dimensions of the members 25 and 26 and their various parts are correlated with respect to each other and also the outer end of leg 36 which separates the two edges 37 and 38 has a curved surface 40 to permit this to occur. After the edge 28 passes beneath the edge 38, if at this instant the handle 20 is released, the weight of cover 2 will carry it slightly in a counterclockwise pivotal direction so that the edge 28 catches or hooks under the edge 38. In this condition of the various parts, the cover 2 is set in a partially tilted open position with respect to vessel 1. That is to say, cover 2 is partially tilted open by interengaged support between edges 28 and 38 and flange 4 and rim 5. If the housewife continues to move handle 20 in an opening direction, cover 2 will continue to be pivoted open about rim 5 along the flange 4 (see FIGS. 8 and 9). Eventually the member 25 will be moved sufficiently in a downward direction so that the outer end of leg 36 is disposed within recess 27 between the two edges 29 and 31. The boss 39 will have moved within the recess 27 to cause the member 25 to bottom against the boss 39 and the edge 37 will catch on edge 31 to prohibit further opening movement of the cover (see FIG. 9). At this instant, the center of gravity of cover 2 will be sufficiently inboard of members 25 and 26 so that if handle 20 is released, the cover 2 will move counterclockwise slightly to cause edge 29 to hook on edge 38 to retain the cover 2 in a full open position with flange 4 and rim 5 engaged (see FIG. 8). The full open position is slightly less than a perpendicular disposition of cover 2 with respect to vessel 1.

The previously described partially open set tilted position comprised an angular disposition of cover 2 with respect to vessel 1 between the fully closed and fully opened position. The angular disposition for cover 2 in its partially open position may be 30, 45 or 60 degrees or any other selective angle depending upon choice of design. Since the members 25 and 26 are not permanently connected to each other the cover 2 can be readily removed from vessel 1 or returned to its closed position from either of its tilted positions. For instance, all that is necessary is to move the cover 2 away from vessel 1 by handle 20 to disengage the engaged edges of members 25 and 26 and then remove or reclose the cover. Closing movement of cover 2 from its tilted position will not be self-initiated due to the weight of cover 2. This is because the weight of cover 2 is not sufficient of itself to overcome the interengagement of edge 38 with either of edges 28 or 29.

In both of the set tilted open positions of cover 2, the housewife has both hands free to work on the food in vessel 1 or perform other household chores. That is to say, unlike the momentary or temporary cover tilt open means adjacent the main handles 20 and 3, the housewife does not have to retain the cover open with one hand. However, the fact that the temporary or momentary cover tilt open means requires the housewife to retain one hand on handle 20 is no disadvantage inasmuch as she is tilting the cover open for an entirely different purpose, namely to merely inspect or view the progress of the food in the frypan. In both set tilt open positions of the cover 2, the rim 4 of the cover is disposed within the marginal outline of the vessel rim 5 so that any drippings from the interior surface of the cover will fall back into the vessel.

Heretofore it was noted that the cover handle 20 can be utilized as a means for returning the cover 2 on the vessel. The same is true of the member 25. Therefore, member 25 serves as an auxiliary handle for cover 2. It will be appreciated by those skilled in the art that electrical frypans currently available on the commercial market are quite large and therefore when they are full with food the loaded frypan becomes quite heavy. This means that main vessel handle 3 may provide insufficient leverage for easy or relatively effortless support of the loaded frypan. In the instant invention, the member 26 is useful as an auxiliary handle for the vessel 1. Inasmuch as member 26 is disposed diametrically opposite to handle 3, a very convenient two-point manual support is provided for the vessel.

In the illustrated form of the invention a plurality of set tilted open positions of the cover, namely two positions, are provided. However, it will be obvious to those skilled in the art that additional set tilted open positions may be provided by forming additional catch edges on the member 25. The edge 28 is preferably cut away at its central portion so that the boss 39 can readily enter the recess 27 so as to serve as a limit means against tilted opening movement of the cover 2 beyond the position in which it is disposed approximately perpendicular with respect to vessel 1.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a cooking utensil comprising an open vessel and a cover for closing the vessel, a main handle connected to one side of the vessel, an auxiliary handle connected to an opposite side of the vessel, a handle on the cover adjacent the main vessel handle, a member connected to the cover adjacent the auxiliary vessel handle, normally disconnected interengageable means on said auxiliary vessel handle and cover connected member for supporting said cover in tilted open position along said opposite vessel side, manual means for moving said cover to said tilted position and bringing said interengageable means into operative relationship, said manual means comprising said cover handle, and means for temporary tilting open of the cover in an opposite direction, said temporary tilting open means comprising said cover handle.

2. In a cooking utensil as in claim 1, wherein said main vessel handle has a pivot surface formed on an upper portion thereof, a depending portion formed on said cover handle, said depending portion extending from said cover handle towards said pivot surface, and said main vessel and cover handles being spaced from each other whereby said cover can be temporarily pivoted open in said opposite direction by movement of said cover handle towards said main vessel handle.

3. In a cooking utensil as in claim 1, wherein each of said handles is constructed from thermal insulating material, and said interengageable means being provided with means for supporting said cover in tilted open position along said opposite vessel side in a plurality of different tilted positions upon tilted raising of said cover by lifting of said cover handle.

4. In a cooking utensil as in claim 3, wherein said main vessel handle has a socket formed in an upper portion thereof, and a protuberance formed on said cover handle and depending therefrom toward said socket, and said main vessel and cover handles being spaced from each other for temporary pivotal opening of said cover in said opposite direction by movement of said cover handle towards said main vessel handle, said socket and protuberance being located adjacent the inner ends of their respective handles.

5. In an electric frypan, said frypan comprising a shallow vessel having a rim edge, an electric heating element connected to the underside of said vessel for heating the same, an elongated handle connected to one side of said vessel, said heating element having a pair of electrical terminals disposed on said one side alongside said handle for energizing said heating element, a cover for said vessel, an elongated handle connected to said cover adjacent said one side, said handles being vertically aligned and extending laterally away from said one side, and said handles being vertically spaced from each other for moving said cover to tilted open position by manually pushing the cover handle toward the vessel handle with the vessel handle disposed and arranged to act as a stop for the cover handle, and means on said vessel and cover along an opposite side of said vessel for tilting said cover open in an opposite direction by lifting said cover handle away from said vessel handle.

6. In a frypan comprising a shallow vessel having a peripherally extending upstanding open rim, a cover for closing said vessel, said cover having a peripheral portion which is seated on said rim when said cover is in closed position, a pair of aligned vertically spaced members connected to said vessel and cover adjacent their respective rim and peripheral portion, means on said pair of members which are interengageable with each other for holding said cover open in a plurality of different tilted positions upon tilted opening of said cover solely by pivotal movement of said peripheral portion on said rim, and manual means connected to said cover for tilting said cover open.

7. In a frypan as in claim 6, wherein said pair of members are constructed from thermal insulating material to serve as auxiliary handles for said cover and vessel, and a pair of main insulating material handles connected to said vessel and cover along a side thereof opposite to said auxiliary handles, said pair of members being normally disconnected from each other and their interengageable means being readily disconnected with respect to each other for quick reclosure or removal of the cover.

8. In a frypan as in claim 7, wherein said pair of main insulating material handles extend laterally away from the frypan, the main cover handle comprising the manual means for opening of said cover by pivotal movement of said peripheral portion on said rim.

9. In a frypan, a cover for said frypan, a pair of members connected to said frypan and cover for holding said cover set in tilted open position upon pivotal opening of said cover about its peripheral portion on the peripheral edge of said frypan, said members being connected to a side of said frypan and cover in aligned but vertically spaced relationship, both of said members projecting laterally from said side and the cover connected member being curved downwardly toward the frypan connected member, a recess formed in the underside of said cover connected member, edge means in said recess, the outer end of said frypan connected member being movable into said recess upon manual pivotal opening movement of said cover, and edge means formed on the outer end of said frypan connected member for engagement with the edge means in said recess to retain said cover in set tilted open position.

10. In a frypan as in claim 9, wherein both of said members are constructed from thermal insulating material to serve as handle means for the vessel and cover, and other means connected to said cover for manually moving it to set tilted open position.

11. In a frypan, a cover for said frypan, a pair of members connected to said frypan and cover for holding said cover set in tilted open position upon pivotal opening of said cover about its peripheral portion on the peripheral edge of said frypan, said members being connected to a side of said frypan and cover in aligned but vertically spaced relationship, both of said members projecting laterally from said side and the cover connected member being curved downwardly toward the frypan connected member, a recess formed in the underside of said cover connected member, edge means at the opposite ends of said recess adjacent the inner and outer ends of said cover connected member, the outer end of said frypan connected member being movable into said recess upon manual pivotal opening movement of said cover, and edge means formed on the outer end of said frypan connected member for engagement with either of the first mentioned edge means to retain said cover in set partial or full tilted open position with respect to said vessel, and said cover peripheral portion being disposed within the marginal outline of said frypan peripheral edge in both said partial and full tilted open positions.

12. In a cooking utensil having an open vessel and a cover for closing the same, elongated handles connected to said vessel and cover, the cover handle being superposed with respect to the vessel handle, and said handles being spaced with respect to each other for pivotal opening of said cover with respect to the vessel by manually downward pushing movement of the cover handle towards the vessel handle with the vessel handle disposed and arranged to act as a stop for the cover handle, said cover and vessel and their handles being disconnected with respect to each other for quick removal of the cover.

13. In a cooking utensil as in claim 12, wherein cooperative pivot means are provided for pivotal opening of said cover by downward movement of the cover handle, said pivot means comprising a rim edge on said open vessel, and a flange formed on said cover, said flange being seated on said rim edge for pivotal movement with respect thereto.

14. In a cooking utensil as in claim 12, wherein cooperative pivot means are provided for pivotal opening of said cover by downward movement of the cover handle, said pivot means comprising a pivot socket formed in one of said handles and a pivot lug formed on the other handle which is adapted to be seated in the pivot socket, said pivot socket and lug being located on portions of said handles relatively close to said vessel.

15. In a cooking utensil as in claim 12, wherein said vessel comprises a frypan, said handles extending laterally away from the frypan, said utensil being provided with cooperative pivot means for pivotal opening of said cover by downward movement of the cover handle, said pivot means comprising a socket-like pivot surface integrally formed in an upper part of said vessel handle, and a pivot lug integrally formed on said cover handle and depending therefrom into said socket-like pivot surface, said pivot means being unconnected with respect to each other for quick removal of said cover from the vessel, and release of said cover handle from a down position operating to effect pivotal reclosure of the cover about said pivot means.

16. In a cooking utensil as in claim 12, wherein cooperative pivot means are provided for pivotal opening of said cover by downward movement of the cover handle, said pivot means comprising means formed on the peripheral portions of said vessel and cover which are seated with respect to each other for relative rocking motion therebetween, and means on said handles for retaining said last-mentioned means seated with respect to each other during their relative rocking motion.

17. In a cooking utensil as in claim 16, wherein said retaining means comprises socket and lug means on said handles, the lug means being disposed in the socket means during downward movement of the cover handle.

References Cited in the file of this patent

UNITED STATES PATENTS 2,886,205     Gerry               May 12, 1959

FOREIGN PATENTS 1,076,924     Germany            Mar. 3, 1960